(12) United States Patent
Iwasaki

(10) Patent No.: US 10,851,959 B2
(45) Date of Patent: Dec. 1, 2020

(54) VEHICLE HEADLIGHT

(71) Applicant: STANLEY ELECTRIC CO., LTD., Tokyo (JP)

(72) Inventor: Takahiro Iwasaki, Ichikawa (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 75 days.

(21) Appl. No.: 16/195,445

(22) Filed: Nov. 19, 2018

(65) Prior Publication Data
US 2019/0154222 A1 May 23, 2019

(30) Foreign Application Priority Data

Nov. 22, 2017 (JP) ................................ 2017-225183

(51) Int. Cl.
*F21S 41/00* (2018.01)
*B60Q 1/00* (2006.01)
*F21S 41/27* (2018.01)
*F21S 41/32* (2018.01)
*F21S 41/663* (2018.01)
(Continued)

(52) U.S. Cl.
CPC ............ *F21S 41/27* (2018.01); *B60Q 1/0041* (2013.01); *F21S 41/143* (2018.01); *F21S 41/148* (2018.01); *F21S 41/26* (2018.01); *F21S 41/265* (2018.01); *F21S 41/32* (2018.01); *F21S 41/322* (2018.01); *F21S 41/323* (2018.01); *F21S 41/36* (2018.01); *F21S 41/663* (2018.01)

(58) Field of Classification Search
None
See application file for complete search history.

(56) References Cited

U.S. PATENT DOCUMENTS

2008/0080207 A1* 4/2008 Specht .................. F21S 41/255 362/581
2013/0155710 A1 6/2013 Albou et al.
(Continued)

FOREIGN PATENT DOCUMENTS

EP 2 607 165 A1 6/2013
EP 3 124 854 A1 2/2017
(Continued)

OTHER PUBLICATIONS

Extended European Search Report for the related European Patent Application No. 18207162.1 dated Apr. 17, 2019.

*Primary Examiner* — Sharon E Payne
(74) *Attorney, Agent, or Firm* — Kenealy Vaidya LLP

(57) ABSTRACT

A vehicle headlight includes lighting body cells that radiates light, each of the lighting body cells includes a light source and a lens body that projects the light emitted from the light source toward a side in front, final emission surfaces of the lens bodies that constitute the plurality of lighting body cells constitute continuous emission surfaces that are continuous with each other, and the light source is disposed further outward in the vehicle width direction than an optical axis of the lens bodies along an advancing direction of a vehicle while passing through a focus of the lens body of the first lighting body cell and the light source is disposed further outward in the vehicle width direction than an optical axis of the lens bodies along an advancing direction of a vehicle while passing through a focus of the lens body of the first lighting body cell.

7 Claims, 5 Drawing Sheets

(51) Int. Cl.
*F21S 41/36* (2018.01)
*F21S 41/143* (2018.01)
*F21S 41/265* (2018.01)
*F21S 41/26* (2018.01)
*F21S 41/148* (2018.01)

(56) References Cited

U.S. PATENT DOCUMENTS

| | | |
|---|---|---|
| 2014/0078768 A1 | 3/2014 | de Lamberterie et al. |
| 2014/0133168 A1* | 5/2014 | Fiederling ............. F21S 41/143 362/235 |
| 2017/0122528 A1* | 5/2017 | Kadoriku ................ F21V 5/008 |
| 2017/0241608 A1* | 8/2017 | Gousset-Rousseau ...................... F21S 41/19 |
| 2017/0292671 A1* | 10/2017 | Gousset-Rousseau ...................... F21S 41/143 |

FOREIGN PATENT DOCUMENTS

| | | |
|---|---|---|
| EP | 3 163 155 A1 | 5/2017 |
| JP | 2011-198719 A | 10/2011 |
| JP | 2012-238450 A | 12/2012 |
| JP | 2014-060155 A | 4/2014 |
| JP | 5677410 B2 | 2/2015 |

* cited by examiner

VEHICLE HEADLIGHT

CROSS-REFERENCE TO RELATED APPLICATION

Priority is claimed on Japanese Patent Application No. 2017-225183, filed Nov. 22, 2017, the content of which is incorporated herein by reference.

BACKGROUND OF THE INVENTION

Field of the Invention

The present invention relates to a vehicle headlight.

Description of Related Art

For example, a lighting tool for a vehicle such as a headlight for a vehicle (headlamp) or the like includes a light source, a reflector configured to reflect light emitted from the light source in an advancing direction of a vehicle, a shade configured to block (cut) some of light reflected by the reflector, and a projection lens configured to project the light, some of which is cut by the shade, in the advancing direction of the vehicle. In such a vehicle headlight, since a light source image defined by a front end of the shade is inverted and projected by the projection lens as a passing beam (a low beam), a light distribution pattern for a low beam including a cutoff line on an upper end of the shade is formed.

In addition, a vehicle headlight in which two light sources and two reflectors are disposed to be aligned in a vehicle width direction, light emitted from the two light sources is reflected by the two reflectors, and optical axes of the two reflectors cross each other in a horizontal plane has been proposed (for example, see Japanese Patent No. 5677410 and Japanese Unexamined Patent Application, First Publication No. 2014-60155). According to the configuration, a light distribution pattern for a wide low beam including a cutoff line can be formed.

SUMMARY OF THE INVENTION

Incidentally, in a vehicle headlight in which a plurality of lighting body cells each including a light source and a lens body configured to project light emitted from the light source in an advancing direction of a vehicle are disposed to be aligned in a vehicle width direction, there is a case in which the illuminance at the near side in front gets excessively increased or robustness (strength with respect to the external factor) gets deteriorate.

Specifically, in a vehicle headlight having the above-mentioned configuration, in the case in which a dimension in a vehicle width direction is restricted, when an interval between neighboring light sources in the vehicle width direction is narrowed, since light is cut by a connecting portion of a reflector corresponding to each light source, the efficiency of use of light is decreased.

Meanwhile, when neighboring reflectors in the vehicle width direction are reduced in size, the illuminance at the near side in front is excessively increased. In addition, since a high positional accuracy of the reflectors with respect to each light source is required, robustness deteriorates.

An aspect of the present invention is directed to providing a vehicle headlight capable of minimizing an excessive increase of an illuminance at the near side in front or deterioration of robustness, and increasing the efficiency of use of light.

A vehicle headlight according to an aspect of the present invention includes a plurality of lighting body cells that are disposed to be aligned in a vehicle width direction and that are configured to radiate light in an advancing direction of a vehicle, wherein each of the lighting body cells comprises a light source configured to emit light and a lens body configured to project the light emitted from the light source toward a side in front, a final emission surface of each lens bodies that constitute the plurality of lighting body cells constitute a continuous emission surface that is continuous with each other, and among the plurality of lighting body cells, regarding a first lighting body cell and a second lighting body cell that are respectively disposed at both ends in the vehicle width direction, a light source of the first lighting body cell is disposed further outward in the vehicle width direction than an optical axis of the lens body of the first lighting body cell extending along the advancing direction of the vehicle while passing through a focus of the lens body of the first lighting body cell and the light source of the second lighting body cell is disposed further outward in the vehicle width direction than an optical axis of the lens body of the second lighting body cell extending along the advancing direction of the vehicle while passing through a focus of the lens body of the second lighting body cell.

In the aspect of the present invention, among the plurality of lighting body cells, regarding a third lighting body cell disposed between the first lighting body cell and the second lighting body cell, a light source of the third lighting body cell may be disposed on an optical axis line of the lens body extending along the advancing direction of the vehicle while passing through a focus of the lens body of the third lighting body cell.

In the aspect of the present invention, the continuous emission surface may have a cylindrical shape or a toric shape.

In the aspect of the present invention, the plurality of lighting body cell may include a reflector configured to reflect the light emitted from the light source toward the lens body and a shade configured to block some of the light reflected by the reflector, a light distribution pattern for a low beam which includes a cutoff line on an upper end thereof may be formed by inverting and projecting a light source image, which is defined by a front end of the shade, using the lens body.

In the aspect of the present invention, the lens body of the plurality of lighting body cell may include an incidence section, a reflective surface and an emission surface, which are disposed along a reference axis extending in a horizontal direction, the light emitted from the light source may enter the lens body from the incidence section, some of the light may be reflected by the reflective surface and then emitted outside from the emission surface, and thus, a light distribution pattern for a low beam which includes a cutoff line, which is defined by a front end of the reflective surface, on an upper end thereof may be formed by inverting and projecting a light source image which is formed in a vicinity of the focus on the emission surface side.

In the aspect of the present invention, the lens bodies that constitute the plurality of lighting body cells may be formed integrally with each other.

According to the aspect of the present invention, it is possible to provide a vehicle headlight capable of increasing the efficiency of use of light while minimizing an excessive increase in illuminance at the near side in front and deterioration of robustness.

DETAILED DESCRIPTION OF THE INVENTION

Figure 1:
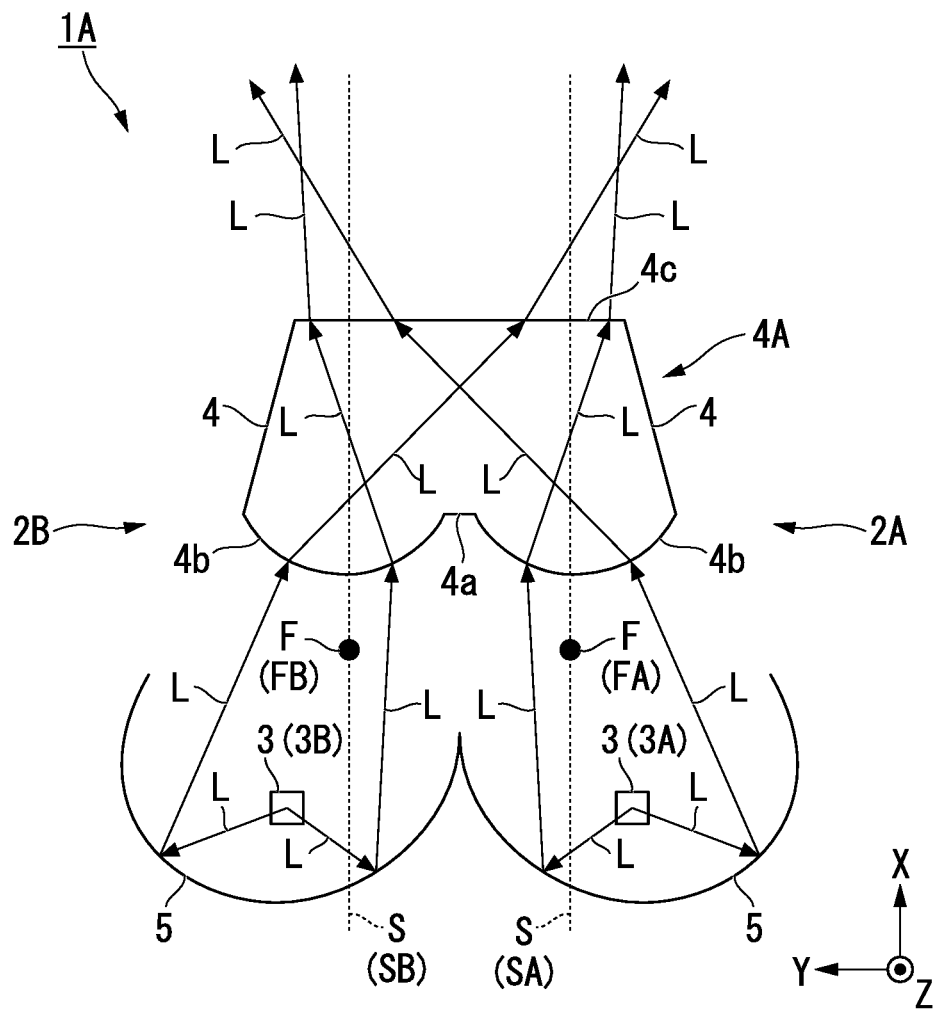
FIG. 1 is a plan view showing a configuration of a vehicle headlight according to a first embodiment of the present invention.

Hereinafter, embodiments of the present invention will be described in detail with reference to the accompanying drawings.

Further, in the drawings used in the following description, in order to make components easier to see, the sizes of dimensions may be shown as being different according to components, and dimensional proportions of the components may not necessarily be the same as actual ones.

First Embodiment

Figure 2:
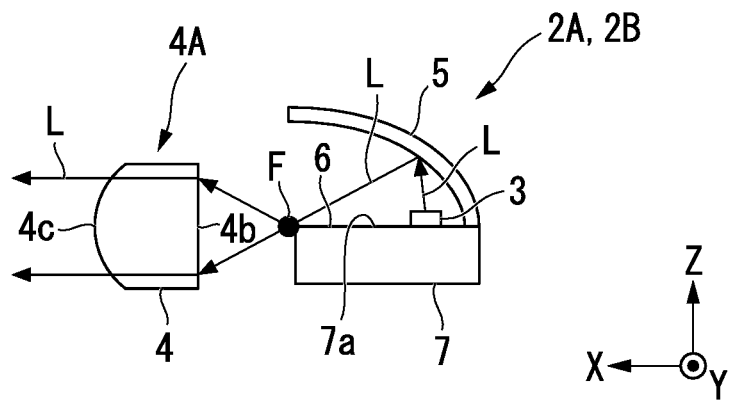
FIG. 2 is a cross-sectional view showing the configuration of the vehicle headlight shown in FIG. 1.

First, as a first embodiment of the present invention, for example, a lighting tool 1A for a vehicle shown in FIG. 1 and FIG. 2 will be described. Further, FIG. 1 is a plan view showing a configuration of the lighting tool 1A for a vehicle. FIG. 2 is a cross-sectional view showing a configuration of the lighting tool 1A for a vehicle. In addition, in the following drawings, an XYZ orthogonal coordinate system is set, an X-axis direction represents a forward and rearward direction of the lighting tool 1A for a vehicle, a Y-axis direction represents a leftward and rightward direction of the lighting tool 1A for a vehicle, and a Z-axis direction represents an upward and downward direction of the lighting tool 1A for a vehicle.

The lighting tool 1A for a vehicle of the embodiment is a headlight for a vehicle (headlight) configured to radiate a passing beam (a low beam) in or along an advancing direction of a vehicle (a +X-axis direction). Specifically, the lighting tool 1A for a vehicle includes a plurality of (in the embodiment, two) lighting body cells 2A and 2B disposed to be aligned in a vehicle width direction (the Y-axis direction) and configured to radiate light L in an advancing direction of a vehicle (a +X-axis direction).

The two lighting body cells 2A and 2B have light sources 3 configured to emit light L, lens bodies 4 configured to project the light L emitted from the light sources 3 toward a side in front, reflectors 5 configured to reflect the light emitted from the light sources 3 toward the lens bodies 4, and shades 6 configured to block some of the light reflected by the reflectors 5. In addition, the two lighting body cells 2A and 2B are mounted on housings 7.

For example, light emitting devices such as light emitting diodes (LEDs), laser diodes (LDs), or the like, can be used for the light sources 3 that constitute the plurality of lighting body cells 2A and 2B. In the embodiment, one LED configured to emit white light is used as each of the light sources 3. In addition, a high output type LED for vehicle lighting may be used as an LED.

The light sources 3 are attached to upper surfaces 7a of the housings 7 via thermal conductive grease (not shown). Accordingly, the light sources 3 emit light L radially upward (in a +Z-axis direction).

Further, types of light source 3 are not particularly limited, and light sources other than the above-mentioned light emitting devices may be used. In addition, while light sources having the same output (size) may be used for the light sources 3, light sources having different outputs (sizes) may be used.

The lens bodies 4 that constitute the plurality of lighting body cells 2A and 2B constitute lens assembly 4A that are formed integrally with each other. That is, the lens assembly 4A have a structure in which the lens bodies 4 are connected to each other via the connecting sections 4a in the vehicle width direction (the Y-axis direction).

Further, a material having a higher refractive index than air, for example, a transparent resin such as polycarbonate, acryl, or the like, glass, or the like, may be used for the lens assembly 4A. In addition, when the transparent resin is used for the lens assembly 4A, the lens assembly 4A can be formed through injection molding using a mold.

The lens bodies 4 having a configuration in which incidence surfaces 4b and emission surface 4c are sequentially disposed in an advancing direction of the vehicle (the +X-axis direction).

The incidence surfaces 4b of the lens bodies 4 are disposed on rear end (rear surface) sides of the lens bodies 4, and configured as cylindrical lens surfaces extending in the upward and downward direction (the Z-axis direction) such that light L entering the lens bodies 4 from the incidence surfaces 4b is condensed in the leftward and rightward direction (the Y-axis direction).

The emission surface 4c of the lens bodies 4 configure final emission surfaces, which are continuous with each other, (hereinafter, referred to as the continuous emission surface 4c) of the lens assembly 4A. The continuous emission surface 4c are disposed on front end (front surface) sides of the lens assembly 4A (the lens bodies 4), and constituted as cylindrical lens surfaces extending in the leftward and rightward direction (the Y-axis direction) such that light L emitted outside of the lens bodies 4 from the continuous emission surface 4c is condensed in the upward and downward direction (the Z-axis direction).

Further, the continuous emission surface 4c are not limited to such cylindrical shapes and may be toric lens surfaces curved in the horizontal direction (the Y-axis direction).

In this case, the light L emitted from the continuous emission surface 4c is not only condensed in the upward and downward direction (the Z-axis direction) but also condensed and diffused in the leftward and rightward direction (the Y-axis direction).

In addition, the other surfaces, descriptions of which are omitted, among the surfaces that constitute the lens assembly 4A (the lens bodies 4), may be freely designed (for example, shielded or the like) without exerting a negative influence on the light L passing through the lens bodies 4.

The reflectors 5 that constitute the plurality of lighting body cells 2A and 2B are formed of, for example, a reflective member of such as die-cast aluminum or the like, and surfaces (inner surfaces) facing the light sources 3 are reflective surfaces. The reflectors 5 are attached to the upper surfaces 7a of the housings 7 to cover upper sides of the light sources 3.

The reflectors 5 are formed to be curved from base end (rear end) sides toward tip (front end) sides in a cross section (an X-axis cross section) in the forward and rearward direction (the X-axis direction) of the vehicle so as to describe parabolas using centers (light emitting points) of the light sources 3 as focuses. Accordingly, the reflectors 5 reflect the light emitted from the light sources 3 in the advancing direction of the vehicle (the +X-axis direction).

In addition, the reflectors 5 are formed to be curved to surround the light sources 3 except in the advancing direction of the vehicle (the +X-axis direction) in a cross-section (a Y-axis cross section) in the leftward and rightward direction (the Y-axis direction) of the vehicle. Accordingly, the reflectors 5 reflect the light emitted from the light sources 3 in the advancing direction of the vehicle (the +X-axis direction) while condensing the light in the leftward and rightward direction (the Y-axis direction).

The shades 6 are constituted by the upper surfaces 7a of the housings 7 (parts of the housings 7). In the lighting tool 1A for a vehicle, after the light L emitted from the light sources 3 is reflected by the reflectors 5, a light source image formed in the vicinity of rear focuses (hereinafter, referred to as focuses) F of the lens bodies 4 is inverted and projected by the lens assembly 4A (the lens bodies 4). Accordingly, the light L projected from the lens assembly 4A (the lens bodies 4) in the advancing direction of the vehicle (the +X-axis direction), which is a passing beam (a low beam), forms a light distribution pattern for a low beam including a cutoff line defined by a front end of the shade 6 (the upper surfaces 7a) on upper end thereof.

Incidentally, in the lighting tool 1A for a vehicle of the embodiment, regarding the lighting body cell (first lighting body cell) 2A on one side and the lighting body cell (second lighting body cell) 2B on the other side respectively disposed at both ends in the vehicle width direction (the Y-axis direction), respective light sources 3 is disposed further outward in the vehicle width direction (the Y-axis direction) than an optical axes S of the respective lens bodies 4 extending in the advancing direction of the vehicle (the +X-axis direction) while passing through the focus F of the respective lens bodies 4.

In the lighting tool 1A for a vehicle of the embodiment, regarding the first lighting body cell 2A and the second lighting body cell 2B respectively disposed at both ends in the vehicle width direction (the Y-axis direction), the light source 3A of the first lighting body cell 2A is disposed further outward in the vehicle width direction (the Y-axis direction) than an optical axis SA of the lens body 4 of the first lighting body cell 2A extending along the advancing direction of the vehicle (the +X-axis direction) while passing through the focus FA of the lens body 4 of the first lighting body cell 2A, and the light source 3B of the second lighting body cell 2B is disposed further outward in the vehicle width direction (the Y-axis direction) than an optical axis SB of the lens body 4 of the second lighting body cell 2B extending along the advancing direction of the vehicle (the +X-axis direction) while passing through the focus FB of the lens body 4 of the second lighting body cell 2B.

In the lighting tool 1A for a vehicle of the embodiment, regarding the first lighting body cell 2A and the second lighting body cell 2B respectively disposed at both ends in the vehicle width direction (the Y-axis direction), an optical axis SA of the lens body 4 of the first lighting body cell 2A extending in the advancing direction of the vehicle (the +X-axis direction) while passing through the focus FA of the lens body 4 of the first lighting body cell 2A and an optical axis SB of the lens body 4 of the second lighting body cell 2B extending in the advancing direction of the vehicle (the +X-axis direction) while passing through the focus FB of the lens body 4 of the second lighting body cell 2B are disposed between the light source 3A and the light source 3B.

In the lighting tool 1A for a vehicle of the embodiment, regarding the first lighting body cell 2A and the second lighting body cell 2B respectively disposed at both ends in the vehicle width direction (the Y-axis direction), the light source 3A of the first lighting body cell 2A is disposed further outward (a direction in which the light source 3A, 3B separates with each other in the vehicle width direction (Y-axis direction)) in the vehicle width direction (the Y-axis direction) than an optical axis SA of the lens body 4 of the first lighting body cell 2A which is formed parallel to the advancing direction of the vehicle (the +X-axis direction) while passing through the focus FA of the lens body 4 of the first lighting body cell 2A, and the light source 3B of the second lighting body cell 2B is disposed further outward (a direction in which the light source 3A, 3B separates with each other in the vehicle width direction (Y-axis direction)) in the vehicle width direction (the Y-axis direction) than an optical axis SB of the lens body 4 of the second lighting body cell 2B which is formed parallel to the advancing direction of the vehicle (the +X-axis direction) while passing through the focus FB of the lens body 4 of the second lighting body cell 2B.

In the case of the configuration, the reflectors 5 corresponding to the light sources 3 can be increased in size by widening an interval between the light sources 3 in the vehicle width direction (the Y-axis direction). Accordingly, it is possible to minimize an excessive increase in illuminance at the near side in front and deterioration of robustness.

In addition, final emission surfaces of the lens bodies 4 are constituted by the continuous emission surface 4c of the lens assembly 4A. In this case, the light L emitted from the light sources 3 is finally emitted from the common continuous emission surface 4c that are continuous in the vehicle width direction (the Y-axis direction). Accordingly, use efficiency of the light L emitted from the light sources 3 can be increased.

Figure 3:
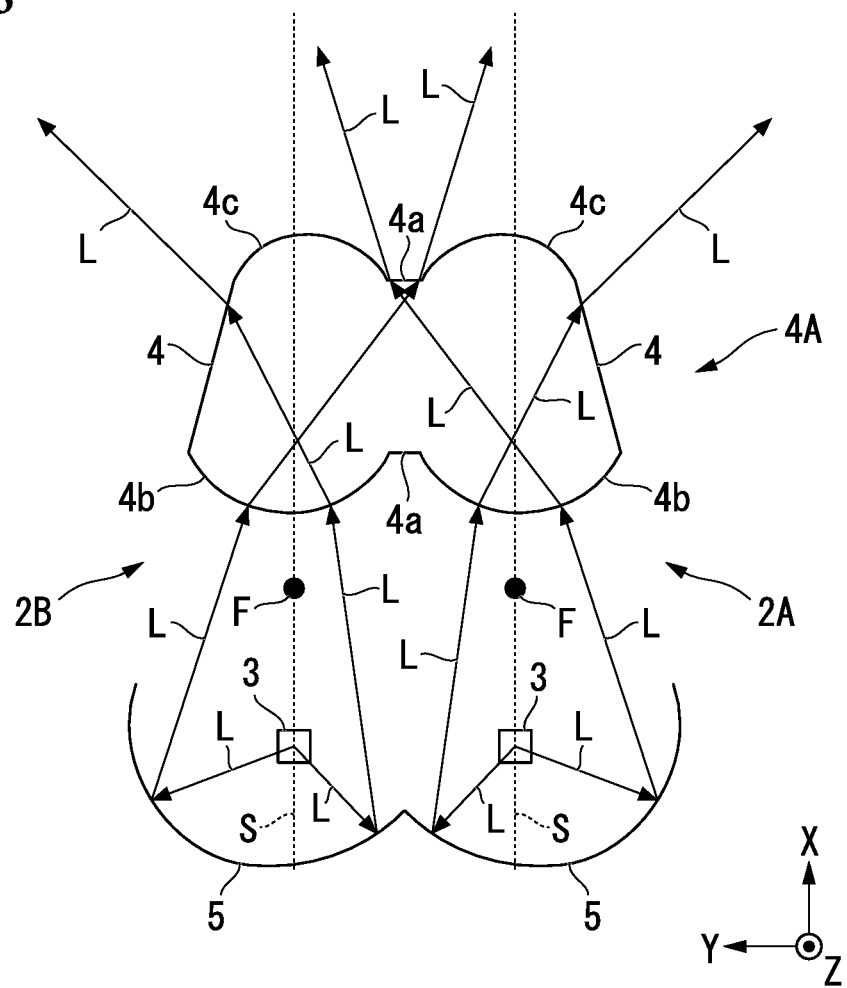
FIG. 3 is a plan view showing a configuration of a vehicle headlight that is a comparative example.
Figure 4:
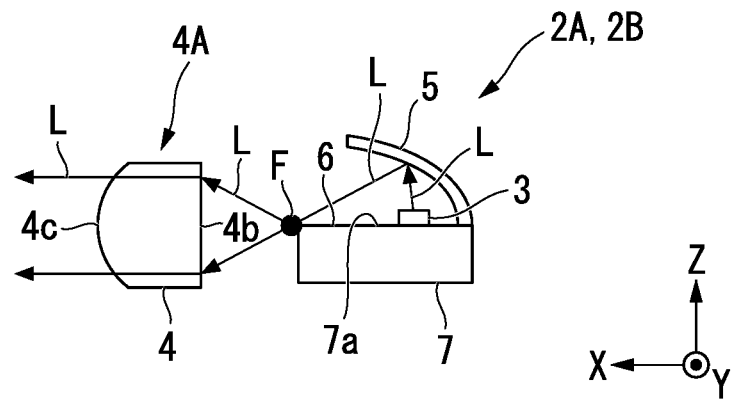
FIG. 4 is a cross-sectional view showing a configuration of the vehicle headlight that is the comparative example.

Here, in a vehicle headlight that is a comparative example, regarding the lighting body cell 2A on the one side and the lighting body cell 2B on the other side disposed at both ends in the vehicle width direction (the Y-axis direction), the case in which the light sources 3 are disposed on the optical axes S of the lens bodies 4 in the advancing direction of the vehicle (the +X-axis direction) passing through the focuses F of the lens bodies 4 is shown in FIG. 3 and FIG. 4.

Further, FIG. 3 is a plan view showing a configuration of a vehicle headlight that is a comparative example. FIG. 4 is a cross-sectional view showing the configuration of the vehicle headlight that is a comparative example. In addition, in FIG. 3 and FIG. 4, parts of the lighting tool 1A for a vehicle which are the same are designated by the same reference numerals. In FIG. 3, the advancing direction of the vehicle and the forward and rearward direction (X-axis direction) of the lighting tool for a vehicle are substantially same direction.

In the vehicle headlight that is the comparative example, as shown in FIG. 3 and FIG. 4, since an interval between the light sources 3 in the vehicle width direction (the Y-axis direction) is narrowed, the reflectors 5 corresponding to the light sources 3 are reduced. In this case, since the light is cut by connecting portions of the reflectors 5 corresponding to the light sources 3, use efficiency of the light is decreased.

In addition, when the neighboring reflectors 5 in the vehicle width direction (the Y-axis direction) are reduced, the illuminance at the near side in front is excessively increased. In addition, since high positional accuracy of the reflectors 5 with respect to the light sources 3 is needed, robustness is deteriorated.

Further, since the emission surface 4c of the lens bodies 4 are connected via the connecting sections 4a, some of the light L is shielded by the connecting sections 4a, and use efficiency of the light L emitted from the light sources 3 is decreased.

On the other hand, in the lighting tool 1A for a vehicle of the embodiment, the efficiency of use of light can be increased while minimizing an excessive increase in illuminance at the near side in front and deterioration of robustness.

Second Embodiment

Figure 5:
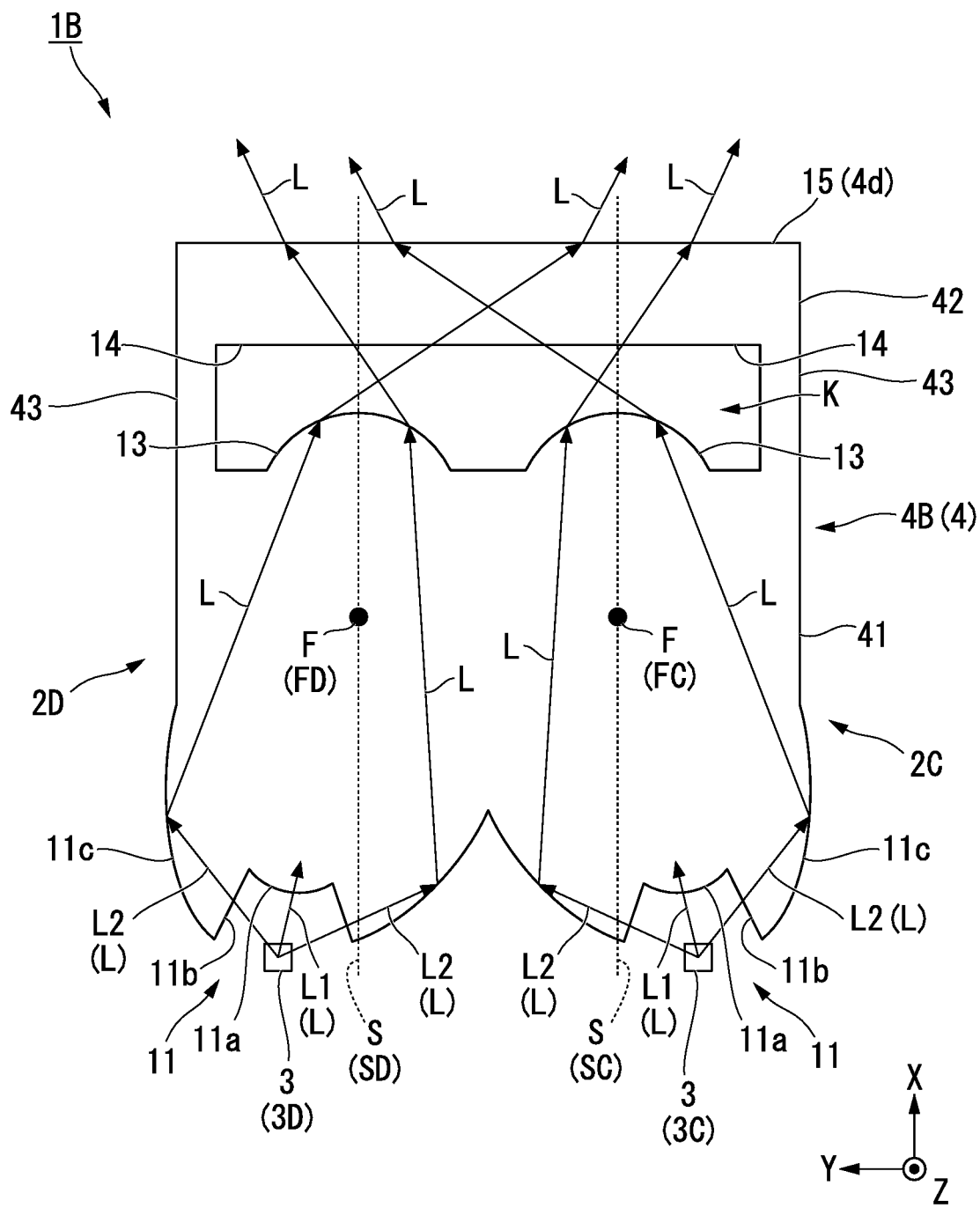
FIG. 5 is a plan view showing a configuration of a vehicle headlight according to a second embodiment of the present invention.
Figure 6:
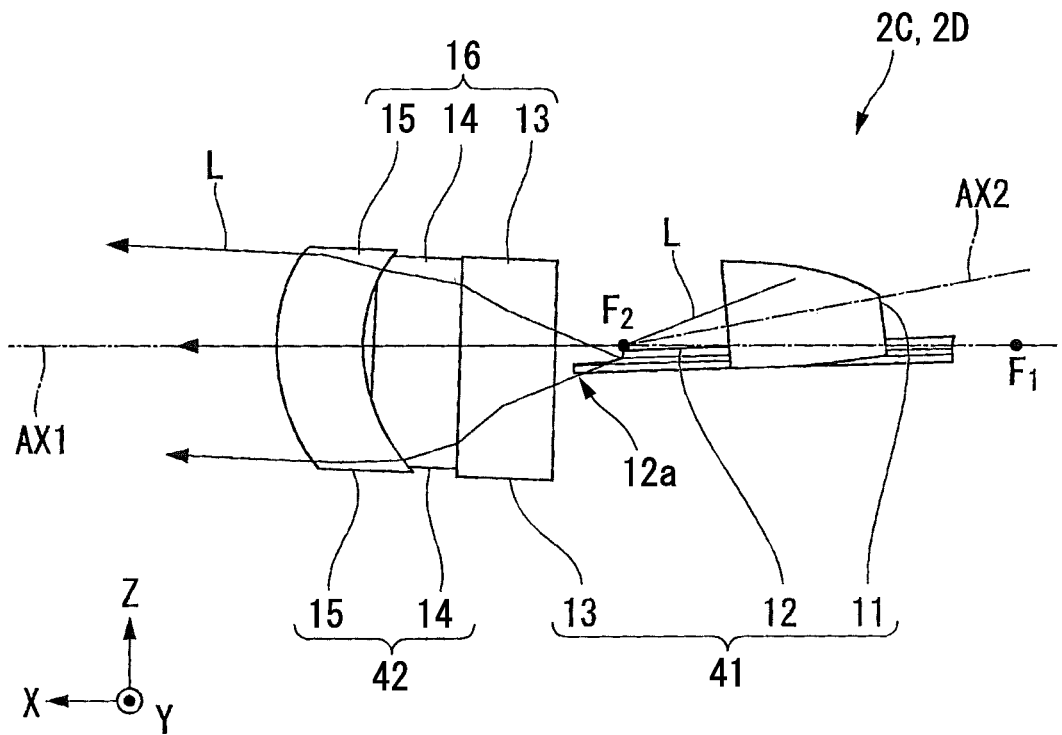
FIG. 6 is a side view showing a configuration of the vehicle headlight shown in FIG. 5.
Figure 7:
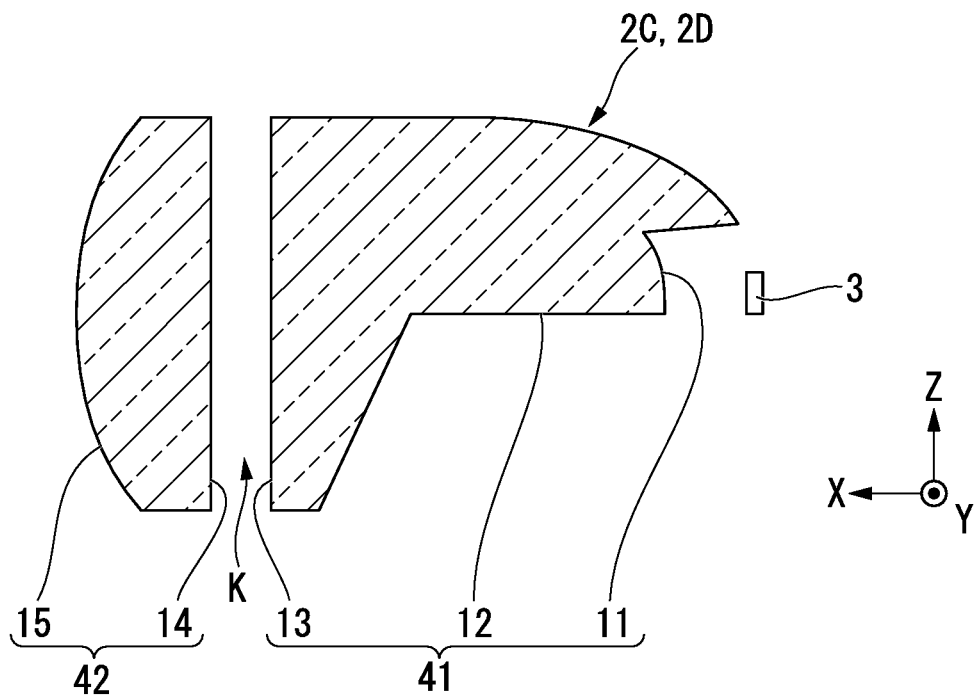
FIG. 7 is a cross-sectional view showing a configuration of the vehicle headlight shown in FIG. 5.

Next, as a second embodiment, for example, a lighting tool 1B for a vehicle shown in FIG. 5, FIG. 6 and FIG. 7 will be described. Further, FIG. 5 is a plan view showing a configuration of the lighting tool 1B for a vehicle. FIG. 6 is a side view showing the configuration of the lighting tool 1B for a vehicle. FIG. 7 is a cross-sectional view showing the configuration of the lighting tool 1B for a vehicle. In addition, in the following description, parts of the lighting tool 1A for a vehicle which are the same are designated by the same reference numerals in the drawings and description thereof will be omitted.

As shown in FIG. 5, FIG. 6 and FIG. 7, the lighting tool 1B for a vehicle of the embodiment is a headlight for a vehicle (a headlight) configured to radiate a passing beam (a low beam) in the advancing direction of the vehicle (the +X-axis direction). Specifically, the lighting tool 1B for a vehicle includes a plurality of (in the embodiment, two) lighting body cells 2C and 2D disposed to be aligned in the vehicle width direction (the Y-axis direction) and configured to radiate light L in the advancing direction of the vehicle (the +X-axis direction).

The two lighting body cells 2C and 2D include the light sources 3 configured to emit light L, and the lens bodies 4 configured to project the light L emitted from the light sources 3 toward a side in front.

The light sources 3 that constitute the plurality of lighting body cells 2C and 2D are disposed such that an optical axis of the light L emitted from the light sources 3 becomes parallel to a first reference axis AX1 extending in the horizontal direction (the X-axis direction). In addition, the light sources 3 radially emit the light L emitted from the light sources 3 in the advancing direction of the vehicle (the +X-axis direction).

Further, the light sources 3 may be disposed in a state in which an optical axis of the light L emitted from the light sources 3 is directed in an inclined forward and downward direction, i.e., in a state in which an optical axis of the light L emitted from the light sources 3 coincides with a second reference axis AX2 inclined with respect to the first reference axis AX1 in the inclined forward and downward direction.

The lens bodies 4 that constitute the plurality of lighting body cells 2C and 2D constitute a lens assembly 4B having first lens section 41 and second lens section 42 aligned in the forward and rearward direction (the X-axis direction), which are formed integrally with each other. That is, the lens assembly 4B has a structure in which the first lens section 41 and the second lens section 42 that constitute the lens bodies 4 are connected in the forward and rearward direction (the X-axis direction).

Further, the same material as that for the lens assembly 4A may be used for the lens assembly 4B. In addition, when a transparent resin is used for the lens assembly 4B, the lens assembly 4B can be formed through injection molding using a mold.

Each of the lens bodies 4 has the first lens section 41 including a first incidence section 11, a reflective surface 12 and a first emission surface 13, and the second lens section 42 including a second incidence surface 14 and a second emission surface 15. That is, the lens bodies 4 have a configuration in which the first incidence section 11, the reflective surface 12, the first emission surface 13, the second incidence surface 14 and the second emission surface 15 are sequentially disposed in the advancing direction of the vehicle (the +X-axis direction).

In addition, the first lens sections 41 and the second lens sections 42 are connected by a pair of connecting sections 43 disposed at both ends in the leftward and rightward direction (the Y-axis direction) between the first emission surfaces 13 and the second incidence surfaces 14. Accordingly, the first emission surfaces 13 and the second incidence surfaces 14 face each other while a space (an air layer) K surrounded by the first lens sections 41, the second lens sections 42 and the pair of connecting sections 43 is sandwiched therebetween.

Further, in the lens assembly 4B, while the first lens section 41 and the second lens section 42 are integrated with each other, some of them may be configured to be separate. For example, the first lens section 41 and the second lens section 42, which are divided, may be combined integrally and used. Meanwhile, when the first lens section 41 and the second lens section 42 are integrated with each other, positional accuracy of the parts (surfaces) can be increased.

The first incidence section 11 constitutes an incidence surface disposed at rear end (rear surface) sides of the first lens section 41 and configured to refract light L from the light sources 3 (accurately, a reference point F1 in optical design) disposed in the vicinity of the first incidence section 11 and cause the light L to enter the first lens section 41.

Specifically, the first incidence section 11 has a first condensing incidence surface 11a, a second condensing incidence surface 11b and a condensing reflective surface 11c, which are disposed at a position facing the light sources 3. The first condensing incidence surface 11a is constituted by free curved surface (non-spherical surfaces) protruding forward from a central section thereof. The second condensing incidence surface 11b is constituted by substantially a cylindrical inner circumferential surface of a portion protruding rearward from a position surrounding the first incidence section 11. The condensing reflective surface 11c is constituted by a substantially truncated conical outer circumferential surface of a portion protruding rearward from a position surrounding the first incidence section 11.

In the first incidence section 11, among the light L emitted from the light source 3, light L1 entering from the first condensing incidence surface 11a is condensed toward the reflective surface 12. Meanwhile, light L2 is condensed toward the reflective surface 12 by reflecting (totally reflecting) the light L2 entering from the second condensing incidence surface 11b at the condensing reflective surface 11c.

Accordingly, the first incidence section 11 are configured such that the light L entering inside of the first lens section 41 from the first incidence section 11 is configured to become light parallel with respect to the first reference axis AX1 in a horizontal cross section (a Y-axis cross section).

Further, the first incidence section 11 may be configured such that the light L entering the first lens section 41 from the first incidence section 11 is condensed closer to the first reference axis AX1 in the horizontal cross section (the Y-axis cross section).

Meanwhile, the first incidence section 11 is configured such that the light L entering inside of the first lens section 41 from the first incidence section 11 passes through a center of the light sources 3 (the reference point F1) and a point (a composite focus F2 of the compound lens 16, which will be described below) in the vicinity of front ends 12a of the reflective surface 12 in the vertical cross section (the Z-axis cross section), and is condensed closer to the second reference axis AX2.

The reflective surface 12 has a planar shape extending forward (in the +X-axis direction) from lower edges of the first incidence section 11 in the horizontal direction (the X-axis direction). In addition, the front end 12a of the reflective surface 12 defines a cutoff line of the light L entering inside of the first lens section 41.

The reflective surface 12 reflects (totally reflect) the light L entering the reflective surface 12, which is among the light L entering inside of the first lens section 41 from the first incidence section 11, at inside of the first lens section 41 toward the first emission surface 13 on a front side. Accordingly, in the first lens section 41, since the reflective surface 12 can be formed without using a reflective metal film formed through metal vapor deposition, increase in costs, a decrease in reflectance, or the like, can be prevented.

In addition, the reflective surface 12 may be inclined with respect to the first reference axis AX1 in an inclined forward and downward direction. In this case, the efficiency of use of light reflected by the reflective surface 12 can be increased while preventing some of the light L reflected by the reflective surface 12 from becoming light that advances in a direction in which the light does not enter the first emission surface 13 (stray light).

The first emission surface 13 is configured as a cylindrical lens surface disposed at a front end (front surface) side of the first lens section 41 and extending in the upward and downward direction (the Z-axis direction) such that the light L emitted from the first emission surface 13 is condensed in the leftward and rightward direction (the Y-axis direction).

The second incidence surface 14 is configured as a flat surface disposed at a rear end (rear surface) side of the second lens section 42 and into which the light L emitted from the first emission surface 13 enters. Further, a shape of the second incidence surface 14 is not limited to such flat surface and may be curved surface (lens surface).

The second emission surface 15 constitutes a continuous emission surface 4d of the lens assembly 4B that are continuous with each other as a final emission surface of the lens bodies 4. The continuous emission surface 4d is configured as a cylindrical lens surface disposed at a front end (front surface) side of the lens assembly 4B (the lens bodies 4) and extending in the leftward and rightward direction (the Y-axis direction) such that the light L emitted from the continuous emission surface 4d to the outer side of the lens bodies 4 is condensed in the upward and downward direction (the Z-axis direction).

Further, the continuous emission surface 4d is not limited to such a cylindrical shape and may be a toric lens surface curved in the horizontal direction (the Y-axis direction).

In this case, the light L emitted from the continuous emission surface 4d may be not only condensed in the upward and downward direction (the Z-axis direction) but also condensed and diffused in the leftward and rightward direction (the Y-axis direction).

In addition, the composite focus F2 of the compound lens 16 constituted by the first emission surface 13, the second incidence surface 14 and the second emission surface 15 is set at the vicinity of the front end 12a of the reflective surface 12 (for example, the vicinity of the center portion of the front end 12a of the reflective surface 12 in the leftward and rightward direction).

Further, among surfaces that constitute the first lens section 41 and the second lens section 42, the other surfaces, illustration or description of which is omitted, can be freely designed (for example, shielding or the like) without exerting a negative influence on the light L passing through the first lens section 41 and the second lens section 42.

In the lighting tool 1B for a vehicle having the above-mentioned configuration, among the light L from the light source 3 entering the first lens section 41 from the first incidence section 11, the light reflected by the reflective surface 12 and then advancing toward the first emission surface 13 (reflected light) and the light that advances toward the first emission surface 13 (going-straight light) are emitted to outer sides (the space K) of the first lens section 41 from the first emission surface 13. Then, the light L enters the second lens section 42 from the second incidence surface 14 while passing through the space K, and then, is emitted outside of the second lens section 42 from the second emission surface 15 (the continuous emission surface 4d).

Accordingly, the light L projected from the lens assembly 4A (the lens bodies 4) in the advancing direction of the vehicle (+X-axis direction), which is a passing beam (a low beam), forms a light distribution pattern for a low beam including a cutoff line defined by the front end 12a of the reflective surface 12 at upper end thereof, by inverting and projecting a light source image formed in a composite focus F2 of a compound lens 16.

Incidentally, in the lighting tool 1B for a vehicle of the embodiment, regarding the lighting body cell (first lighting body cell) 2C on the one side and the lighting body cell (second lighting body cell) 2D on the other side respectively disposed at both ends in the vehicle width direction (the Y-axis direction), respective light sources 3 is disposed further outward in the vehicle width direction (the Y-axis direction) than the optical axes S of the respective lens bodies 4 extending in the advancing direction of the vehicle (the +X-axis direction) while passing through the focus F of the respective lens bodies 4.

In the lighting tool 1B for a vehicle of the embodiment, regarding the first lighting body cell 2C and the second lighting body cell 2D respectively disposed at both ends in the vehicle width direction (the Y-axis direction), the light source 3C of the first lighting body cell 2C is disposed further outward in the vehicle width direction (the Y-axis direction) than an optical axis SC of the lens body 4 of the first lighting body cell 2C extending along the advancing direction of the vehicle (the +X-axis direction) while passing through the focus FC of the lens body 4 of the first lighting body cell 2C, and the light source 3D of the second lighting body cell 2D is disposed further outward in the vehicle width direction (the Y-axis direction) than an optical axis SD of the lens body 4 of the second lighting body cell 2D extending along the advancing direction of the vehicle (the +X-axis direction) while passing through the focus FD of the lens body 4 of the second lighting body cell 2D.

In the lighting tool 1B for a vehicle of the embodiment, regarding the first lighting body cell 2C and the second lighting body cell 2D respectively disposed at both ends in the vehicle width direction (the Y-axis direction), an optical axis SC of the lens body 4 of the first lighting body cell 2C extending in the advancing direction of the vehicle (the +X-axis direction) while passing through the focus FC of the lens body 4 of the first lighting body cell 2C and an optical axis SD of the lens body 4 of the second lighting body cell 2D extending in the advancing direction of the vehicle (the +X-axis direction) while passing through the focus FD of the lens body 4 of the second lighting body cell 2D are disposed between the light source 3C and the light source 3D.

In the lighting tool 1B for a vehicle of the embodiment, regarding the first lighting body cell 2C and the second lighting body cell 2D respectively disposed at both ends in the vehicle width direction (the Y-axis direction), the light source 3C of the first lighting body cell 2C is disposed further outward (a direction in which the light source 3C, 3D separates with each other in the vehicle width direction (Y-axis direction)) in the vehicle width direction (the Y-axis direction) than an optical axis SC of the lens body 4 of the first lighting body cell 2C which is formed parallel to the advancing direction of the vehicle (the +X-axis direction) while passing through the focus FC of the lens body 4 of the first lighting body cell 2C, and the light source 3D of the second lighting body cell 2D is disposed further outward (a direction in which the light source 3C, 3D separates with each other in the vehicle width direction (Y-axis direction)) in the vehicle width direction (the Y-axis direction) than an optical axis SD of the lens body 4 of the second lighting body cell 2D which is formed parallel to the advancing direction of the vehicle (the +X-axis direction) while passing through the focus FD of the lens body 4 of the second lighting body cell 2D.

In the case of this configuration, by making the interval between the light sources 3 in the vehicle width direction (the Y-axis direction) wider, the first incidence section 11 corresponding to each of the light sources 3 can be increased. Accordingly, it is possible to minimize an excessive increase in illuminance at the near side in front or deterioration of robustness.

In addition, the final emission surface of each of the lens bodies 4 is constituted by the continuous emission surface 4d of the lens assembly 4B. In this case, the light L emitted from each of the light sources 3 is finally emitted from the common continuous emission surface 4d that is continuous with each other in the vehicle width direction (the Y-axis direction). Accordingly, use efficiency of the light L emitted from the light sources 3 can be increased.

Accordingly, in the lighting tool 1B for a vehicle of the embodiment, like the lighting tool 1A for a vehicle, it is possible to increase the efficiency of use of light while minimizing an excessive increase in illuminance at the near side in front and deterioration of robustness.

Further, the present invention is not necessarily limited to the above-mentioned embodiments and various modifications may be made without departing from the scope of the present invention.

Figure 8:
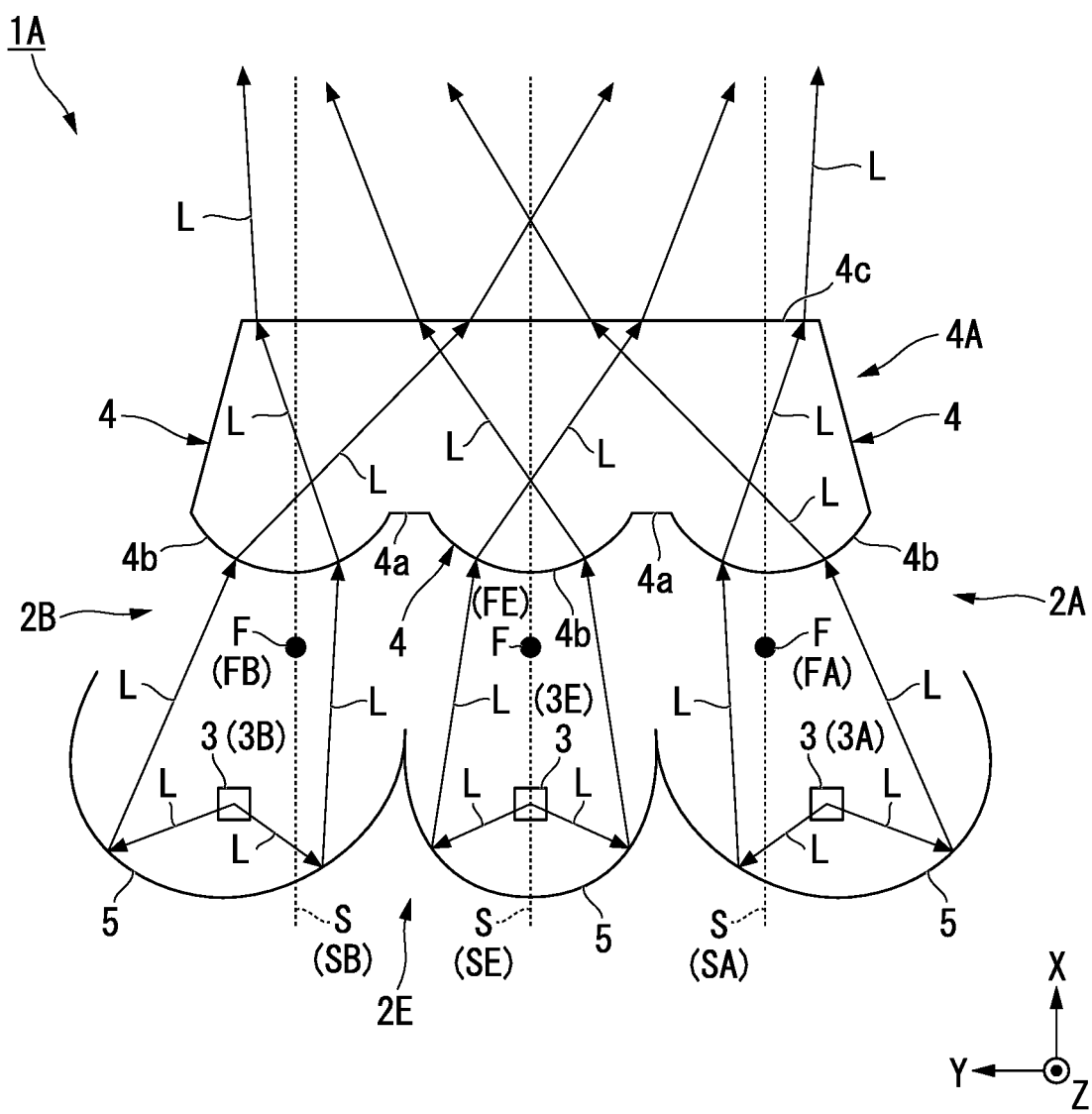
FIG. 8 is a plan view showing another configuration example of the vehicle headlight to which the present invention is applied.

For example, while the lighting tool 1A for a vehicle may have the configuration including the two lighting body cells 2A and 2B, in the case in which three or more lighting body cells are provided, for example, a configuration as shown in FIG. 8 may be provided.

Specifically, among the plurality of (in the example, three) lighting body cells 2A, 2B and 2E, regarding the lighting body cell (first lighting body cell) 2A on the one side and the lighting body cell (second lighting body cell) 2B on the other side respectively disposed at both ends in the vehicle width direction, respective light sources 3 is disposed further outward in the vehicle width direction (the Y-axis direction) than the optical axes S of the respective lens bodies 4 extending in the advancing direction of the vehicle (the +X-axis direction) while passing through the focus F of the respective lens bodies 4.

Among the plurality of (in the example, three) lighting body cells 2A, 2B and 2E, regarding the first lighting body cell 2A and the second lighting body cell 2B respectively disposed at both ends in the vehicle width direction (the Y-axis direction), the light source 3A of the first lighting body cell 2A is disposed further outward in the vehicle width direction (the Y-axis direction) than an optical axis SA of the lens body 4 of the first lighting body cell 2A extending along the advancing direction of the vehicle (the +X-axis direction) while passing through the focus FA of the lens body 4 of the first lighting body cell 2A, and the light source 3B of the second lighting body cell 2B is disposed further outward in the vehicle width direction (the Y-axis direction) than an optical axis SB of the lens body 4 of the second lighting body cell 2B extending along the advancing direction of the vehicle (the +X-axis direction) while passing through the focus FB of the lens body 4 of the second lighting body cell 2B.

Among the plurality of (in the example, three) lighting body cells 2A, 2B and 2E, regarding the first lighting body cell 2A and the second lighting body cell 2B respectively disposed at both ends in the vehicle width direction (the Y-axis direction), an optical axis SA of the lens body 4 of the first lighting body cell 2A extending in the advancing direction of the vehicle (the +X-axis direction) while passing through the focus FA of the lens body 4 of the first lighting body cell 2A and an optical axis SB of the lens body 4 of the second lighting body cell 2B extending in the advancing direction of the vehicle (the +X-axis direction) while passing through the focus FB of the lens body 4 of the second lighting body cell 2B are disposed between the light source 3A and the light source 3B.

Among the plurality of (in the example, three) lighting body cells 2A, 2B and 2E, regarding the first lighting body cell 2A and the second lighting body cell 2B respectively disposed at both ends in the vehicle width direction (the Y-axis direction), the light source 3A of the first lighting body cell 2A is disposed further outward (a direction in which the light source 3A, 3B separates with each other in the vehicle width direction (Y-axis direction)) in the vehicle width direction (the Y-axis direction) than an optical axis SA of the lens body 4 of the first lighting body cell 2A which is formed parallel to the advancing direction of the vehicle (the +X-axis direction) while passing through the focus FA of the lens body 4 of the first lighting body cell 2A, and the light source 3B of the second lighting body cell 2B is disposed further outward (a direction in which the light source 3A, 3B separates with each other in the vehicle width direction (Y-axis direction)) in the vehicle width direction (the Y-axis direction) than an optical axis SB of the lens body 4 of the second lighting body cell 2B which is formed parallel to the advancing direction of the vehicle (the +X-axis direction)

while passing through the focus FB of the lens body 4 of the second lighting body cell 2B.

Meanwhile, among the plurality of lighting body cells 2A, 2B and 2E, regarding the lighting body cell (third lighting body cell) 2E disposed between the lighting body cell (first lighting body cell) 2A on the one side and the lighting body cell (second lighting body cell) 2B on the other side, it is preferable to dispose the light source 3E of the lighting body cell 2E on the optical axis SE of the lens body 4 of the lighting body cell 2E extending along the advancing direction of the vehicle (the +X-axis direction) while passing through the focus FE of the lens bodies 4 of the lighting body cell 2E.

Accordingly, like the lighting tool 1A for a vehicle, it is possible to increase the efficiency of use of light while minimizing an excessive increase in illuminance at the near side in front and deterioration of robustness.

In addition, while the lighting tool 1B for a vehicle has the configuration including the two lighting body cells 2C and 2D, when the three or more lighting body cells are provided, the same configuration as shown in FIG. 8 may be provided. Accordingly, like the lighting tool 1B for a vehicle, it is possible to increase the efficiency of use of light while minimizing an excessive increase in illuminance at the near side in front and deterioration of robustness.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle headlight comprising:
   a plurality of lighting body cells that are disposed to be aligned in a vehicle width direction and that are configured to radiate light along an advancing direction of a vehicle,
   wherein each of the lighting body cells comprises a light source configured to emit light and a lens body configured to project the light emitted from the light source toward a side in front,
   each of the lens body of the lighting body cells includes an incidence surface and an emission surface, the incidence surface including a lens surface configured to condense the light entering the lens body in the vehicle width direction, the emission surface including a lens surface configured to condense the light emitted outside of the lens body in an upward and a downward direction,
   each of the lens body of the lighting body cells are connected to each other in the vehicle width direction to form a lens assembly,
   the lens assembly includes a continuous emission surface as a final emission surface, the continuous emission surface being formed by the emission surfaces of each of the lens body that are made continuous with each other,
   among the plurality of lighting body cells, regarding a first lighting body cell and a second lighting body cell that are respectively disposed at both ends in the vehicle width direction, an optical axis of the lens body of the first lighting body cell extending along the advancing direction of the vehicle while passing through a focus of the lens body of the first lighting body cell and an optical axis of the lens body of the second lighting body cell extending along the advancing direction of the vehicle while passing through a focus of the lens body of the second lighting body cell are disposed between a light source of the first lighting body cell and a light source of the second lighting body cell in the vehicle width direction,
   each of the plurality of lighting body cell comprises a reflector configured to reflect the light emitted from the light source toward the lens body,
   the reflector of the first lighting body cell and the reflector of the second lighting body cell are formed to be curved parabolas having each corresponding light sources as focuses of the reflectors,
   the light emitted from the light source of the first lighting body cell is reflected in the advancing direction of the vehicle at the reflector of the first lighting body cell and enters the incidence surface of the lens body of the first light body cell at a position closer to the optical axis of the lens body of the first lighting body cell than the light source of the first lighting body cell,
   the light emitted from the light source of the second lighting body cell is reflected in the advancing direction of the vehicle at the reflector of the second lighting body cell and enters the incidence surface of the lens body of the second light body cell at a position closer to the optical axis of the lens body of the second lighting body cell than the light source of the second lighting body cell, and
   both of the lights that has entered each of the incidence surfaces of the first lighting body cell and the second lighting body cell are emitted outside of the continuous emission surface and are diffused in the vehicle width direction.

2. The vehicle headlight according to claim 1,
   wherein, among the plurality of lighting body cells, regarding a third lighting body cell disposed between the first lighting body cell and the second lighting body cell, a light source of the third lighting body cell is disposed on an optical axis line of the lens body extending along the advancing direction of the vehicle while passing through a focus of the lens body of the third lighting body cell.

3. The vehicle headlight according to claim 1,
   wherein the incidence surfaces of each of lens bodies of the plurality of lighting body cells is a cylindrical lens surface extending in the upward and downward direction, and the continuous emission surface is a cylindrical lens surface extending in the vehicle width direction or a toric lens surface.

4. The vehicle headlight according to claim 1,
   wherein the plurality of lighting body cell comprises: a shade configured to block some of the light reflected by the reflector,
   a light distribution pattern for a low beam which includes a cutoff line on an upper end thereof is formed by inverting and projecting a light source image, which is defined by a front end of the shade, using the lens body.

5. A vehicle headlight comprising,
   a plurality of lighting body cells that are disposed to be aligned in a vehicle width direction and that are configured to radiate light along an advancing direction of a vehicle,
   wherein each of the lighting body cells comprises a light source configured to emit light and a lens body configured to project the light emitted from the light source toward a side in front, the lens body includes (i) a first incidence section that is configured to condense the light from the light source, (ii) a first emission surface having a lens surface that is configured to condense the light entering the lens body in the vehicle width direction, (iii) a second incidence surface that is configured to re-enter the light emitted from the first emission surface into the lens body via an air layer, and (iv) a second emission surface that is a lens surface configured to condense the light emitted outside from the lens body in upward and downward direction, and the first incidence section, the first emission surface, the second incidence surface and the second emission surface being sequentially disposed in the advancing direction of the vehicle, each of the lens body of the lighting body cells are connected to each other in the vehicle width direction to form a lens assembly, the lens assembly includes a continuous emission surface as a final emission surface, the continuous emission surface being formed by the emission surfaces of each of the lens body that are made continuous with each other, among the plurality of lighting body cells, regarding a first lighting body cell and a second lighting body cell that are respectively disposed at both ends in the vehicle width direction, an optical axis of the lens body of the first lighting body cell extending along the advancing direction of the vehicle while passing through a composite focus of the lens body of the first lighting body cell constituted by the first emission surface, the second incidence surface and the second emission surface and an optical axis of the lens body of the second lighting body cell extending along the advancing direction of the vehicle while passing through a composite focus of the lens body of the second lighting body cell constituted by the first emission surface, the second incidence surface and the second emission surface are disposed between a light source of the first lighting body cell and a light source of the second lighting body cell in the vehicle width direction, the light source of the first lighting body cell and the light source of the second lighting body cell are disposed in the vicinity of the corresponding first incidence section, the light emitted from the light source of the first lighting body cell advances to the first emission surface of the first lighting body cell from the first incidence section of the first lighting body cell and is emitted from the first emission surface of the first lighting body cell, the light emitted from the light source of the second lighting body cell advances to the first emission surface of the second lighting body cell from the first incidence section of the second lighting body cell and is emitted from the first emission surface of the second lighting body cell, and both of the lights that has been emitted from the first emission surfaces of the first lighting body cell and the second lighting body cell are emitted outside of the continuous emission surface and are diffused in the vehicle width direction.

6. The vehicle headlight according to claim 5, wherein each of the first emission surfaces of the lens body of the plurality of lighting body cells is a cylindrical lens surface extending in the upward and downward direction, and the continuous emission surface is a cylindrical lens surface extending in the vehicle width direction or a toric lens surface.

7. The vehicle headlight according to claim 6, wherein a reflective surface of the lens body of the plurality of lighting body cell is formed between the first incidence section and the first emission surface along a reference axis extending in a horizontal direction, the light emitted from the light source enters the lens body from the first incidence section, some of the light is reflected by the reflective surface and then emitted outside from the second emission surface, and thus, a light distribution pattern for a low beam which includes a cutoff line, which is defined by a front end of the reflective surface, on an upper end thereof is formed by inverting and projecting a light source image which is formed in a vicinity of the focus on the second emission surface side.

* * * * *